United States Patent
Chang et al.

(10) Patent No.: US 7,085,961 B2
(45) Date of Patent: Aug. 1, 2006

(54) REDUNDANT MANAGEMENT BOARD BLADE SERVER MANAGEMENT SYSTEM

(75) Inventors: Ying-Che Chang, Taipei (TW); Jen-Shuen Huang, Pateh (TW); Chong-I Chang, Taoyuan (TW)

(73) Assignee: Quanta Computer Inc., Taoyuan Shien (TW)

( * ) Notice: Subject to any disclaimer, the term of this patent is extended or adjusted under 35 U.S.C. 154(b) by 611 days.

(21) Appl. No.: 10/330,342

(22) Filed: Dec. 30, 2002

(65) Prior Publication Data

US 2004/0153697 A1 Aug. 5, 2004

(30) Foreign Application Priority Data

Nov. 25, 2002 (TW) ............................... 91218986 U

(51) Int. Cl.
*G06F 11/00* (2006.01)

(52) U.S. Cl. ........................................... 714/13; 714/10

(58) Field of Classification Search ................... 714/13
See application file for complete search history.

(56) References Cited

U.S. PATENT DOCUMENTS

| | | | | |
|---|---|---|---|---|
| 5,313,386 | A * | 5/1994 | Cook et al. ................... | 700/82 |
| 5,515,501 | A * | 5/1996 | LaBerge et al. .............. | 714/10 |
| 5,997,166 | A * | 12/1999 | Flood ............................ | 700/2 |
| 6,658,595 | B1 * | 12/2003 | Thamattoor ................... | 714/11 |
| 6,931,568 | B1 * | 8/2005 | Abbondanzio et al. ....... | 714/11 |
| 2002/0099972 | A1 * | 7/2002 | Walsh et al. .................. | 714/10 |
| 2003/0033348 | A1 * | 2/2003 | King et al. ................... | 709/201 |
| 2004/0024831 | A1 * | 2/2004 | Yang et al. ................... | 709/208 |
| 2004/0073833 | A1 * | 4/2004 | Krishnamurthy et al. ..... | 714/10 |

FOREIGN PATENT DOCUMENTS

CN 1508713 A * 6/2004

OTHER PUBLICATIONS

Internet Press Release from Amphus, "Tatung Ships New 800 Mhz 2U Blade Server With Integrated Gigabit Ethernet Switches and ManageSite Software"; Aug. 5, 2002. http://www.amphus.com/news/press_release.asp?id=26; TUD-2016 Ultra-Dense Blade Server, Tatung Science & Technology, Inc., Fremont, CA 94639, 5 pages.

* cited by examiner

*Primary Examiner*—Scott Baderman
*Assistant Examiner*—Gabriel L. Chu
(74) *Attorney, Agent, or Firm*—Rabin & Berdo P.C.

(57) ABSTRACT

A blade server management system with an auxiliary management structure is described. The system has at least two management boards and a connecting base. The two management boards become one master management board to control directly the system and a slave management board standing by to take over system control according to a predetermined timing to detect heart beat signals and the inserted positions on the connecting base. A first COM port is a main interconnecting line between the management boards, and a LAN port is an auxiliary interconnecting line. A local computer connecting with a second COM port is utilized auxiliary to control the management system. The slave management board is promoted to master management board status when the original master management blade fails. Therefore, the system stability can be increased.

19 Claims, 1 Drawing Sheet

REDUNDANT MANAGEMENT BOARD BLADE SERVER MANAGEMENT SYSTEM

FIELD OF THE INVENTION

The present invention relates to a blade server management system and especially to a blade server management system with an auxiliary management structure.

BACKGROUND OF THE INVENTION

Information technology and the computer industry are highly developed now. People rely heavily on computer systems. Therefore, computer servers with high calculation capacity and high stability are important for computer systems. Due to increasingly reduced office space, area occupied by computer servers must also be reduced. Traditional computer servers must maintain a high degree of stability to serve users, and the space occupied by one computer server is therefore greater than or equal to that of a desktop computer. The management of computer servers is difficult and the space utilization is tightened. Some normal companies have 2 or 3 computer servers, while others may have more than a thousand computer servers. Computer server management and space utilization become more critical in companies with more computer servers.

A blade server is a current trend in computer servers. The blade server combines the hardware of the computer server, such as a processor, a memory and a network connection, in one extension card, also known as one server blade. The blade server has a higher calculation capacity and higher stability, and occupies less space than a traditional computer server. Further, the blade server reduces the cost and the working temperature; moreover many functions and performance thereof are better than those of traditional computer servers. The blades of the blade server, called server blades, are inserted in a connecting base in a blade server system. Therefore, after the user buys the required server blades and inserts the server blades in the connecting base, the servers new inserted can work immediately. Each server blade works independently from other server blades. When the user needs more servers, the user needs only to insert additional server blades into the connecting base. Therefore, a plurality of blade servers may work in one casing which is similar in size to one conventional server.

The blade servers are high speed and stable computer server equipment for users having many servers such as a telecommunication company, Internet portal company, or internet services provider (ISP), and users needing great quantities of high speed calculations such as meteorological phenomena calculations, astronomical observations and calculations, deoxyribonucleic acid calculations in bioscience, and computer animation for the movie industry.

There are two types of blade server managements. One is an in-band management and one is an out-band management. For the in-band management, the management software is based on a basic input/output system (BIOS) or an operating system (OS). The in-band management utilizes software to control blade servers without any management board. Therefore, if any one blade server crashes, the server manager may lose the blade server. For the out-band management, there is a management board to control the blade servers. If any server blade is functioning in an unusual manner, the management board reports to the server manager and then the server manager immediately deals with the unusual phenomenon according to the report. But if the management board crashes, out-band management degenerates into in-band management. That is, if any blade server crashes in the meantime, the server manager still loses the blade server and fails to control and repair the blade server immediately.

SUMMARY OF THE INVENTION

There is a need to provide a blade server management system with an auxiliary management structure to assist the management board immediately when the management board crashes so that the server manager can always control the blade servers and repair the crashed blade servers, enhancing the overall stability of the blade servers.

One object of the present invention is therefore to provide a blade server management system with an auxiliary management structure to enhance the stability of the management of the blade servers.

Another object of the present invention is to provide a blade server management system with an auxiliary management structure which further uses local computers assisting to manage the blade servers.

The present invention provides a blade server management system with an auxiliary management structure for controlling server blades and switch blades. The blade server management system includes a connecting base, two management boards, and a memory. Each management board has capacity to generate heart beat signals and controls the server blades and the switch blades. Each management board has two communication ports and a local network area port. The first communication port is used for information synchronization within the management boards. The second communication port connects with a local computer capable of directly controlling the server blades and the switch blades. The local area network port connects with the switch blades to deliver network packets and messages and is further in charge of information synchronization when the first communication port fails to work.

The connecting base has a first management board slot and a second management board slot to connect the two management boards and a plurality blade slots to connect the server blades and the switch blades. If the management board inserted in the first management board slot waits for a first predetermined period and cannot get the heart beat signals from the other management board, the management board becomes a master management board automatically. The master management board controls the server blades and the switch blades and generates the heart beat signals to the other management board. The other management board thus become slave management boards connected to the master board by the respective first communication port for information synchronization and to stand by to take over the master management board. But if the other management board waits for a second predetermined period and still receives no heart beat signals from the management board, the other management board becomes the new master management board. The new master management board controls the server blades and the switch blades and generates the heart beat signals to the management board. The management board then becomes a slave management board. The second predetermined period is longer than the first predetermined period; for example, the first predetermined period is about 3 seconds and the second predetermined period is about 5 seconds. The memory connects with the connecting base to record working statuses of the master management board and provides the working statuses to the new management board while the new management board takes over from the original management board for continually controlling the server blades and the switch blades.

The local area network further connects with a network to deliver the network packets and the messages. The master management board and the slave management board are interchangeable according to an application software request. The master management board and the slave management board are separated by hardware isolations to keep the slave management board from controlling the server blades and the switch blades directly.

Therefore, the present invention increases the stability of the blade servers. The server manager can control the servers more efficiently and obtain information regarding these servers working status immediately.

BRIEF DESCRIPTION OF THE DRAWINGS

The foregoing aspects and many of the attendant advantages of this invention will be more readily appreciated as the same becomes better understood by reference to the following detailed description when taken in conjunction with the accompanying drawing, wherein.

DETAILED DESCRIPTION OF THE PREFERRED EMBODIMENT

Figure 1:
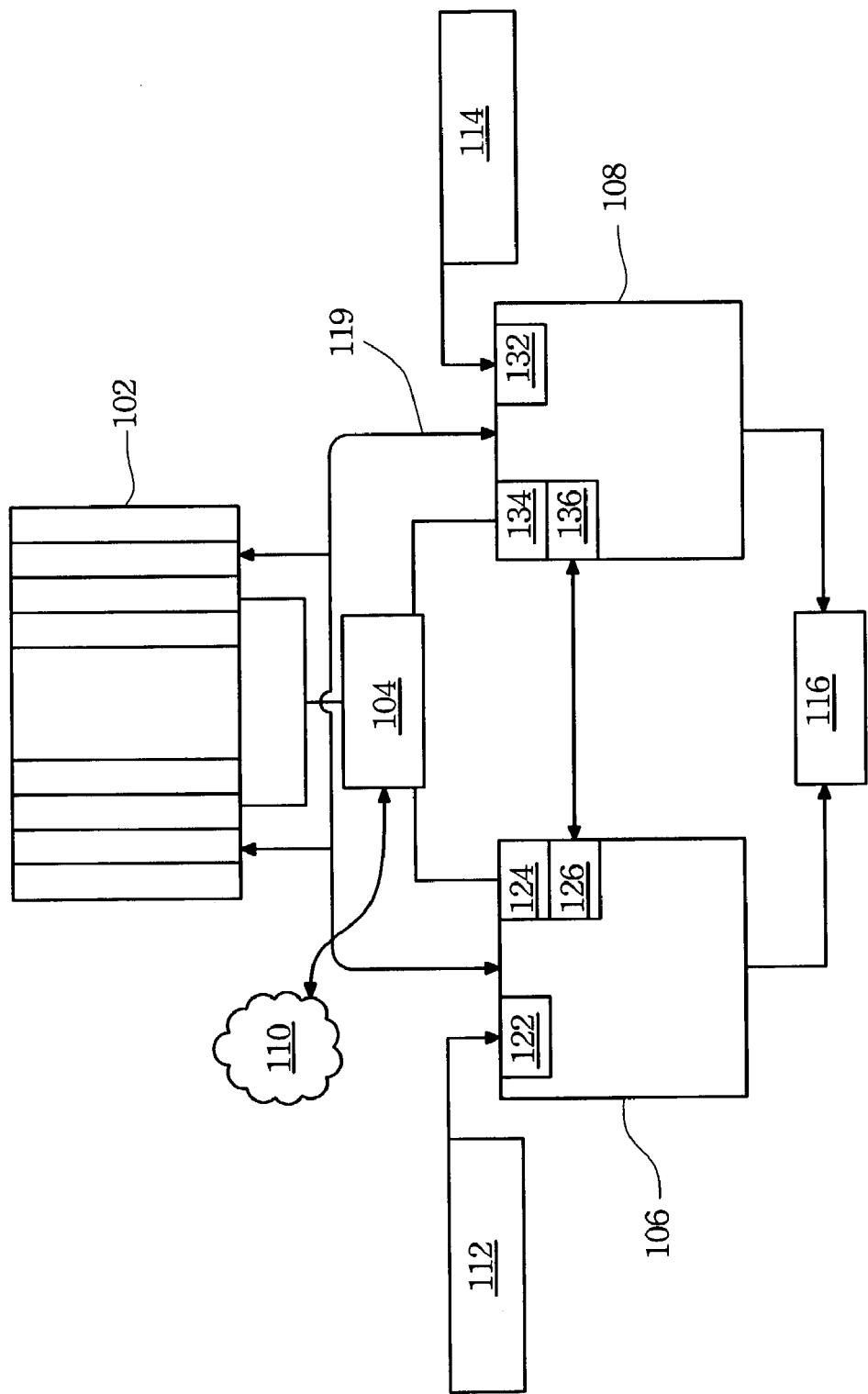
FIG. 1 schematically illustrates one preferred embodiment of the blade server management system with an auxiliary management structure according to the present invention.

The following description is of the best presently contemplated mode of carrying out the present invention. This description is not to be taken in a limiting sense but is made merely for the purpose of describing the general principles of the invention. The scope of the invention should be determined by referencing the appended claims.

FIG. 1 is one preferred embodiment of the blade server management system with an auxiliary management structure according to the present invention. The blade server management system according to the present invention has a first management board 106, a second management board 108, a switch blade 104, a plurality of server blades 102, a memory 116 for recording system statuses, and a connecting base 118. The first management board 106 includes a first communication (COM) port 126, a second COM port 122, a local area network (LAN) port 124, and connects with the memory 116 by way of the local bus 119. Similarly, the second management board 108 includes a first communication (COM) port 136, a second COM port 132, a LAN port 134, and connects with the memory 116 by way of the local bus 119.

The blade server management system utilizes the first management board 106 and the second management board 108 to control all the server blades 102 and switch blade 104. The quantity of the server blade 102 and switch blade 104 can be determined by the actual request. For example, if only two server blades and one switch blade are requested, the server manager inserts the two server blades and one switch blade in the connecting base 118. The blade server management system according to the present invention can then control and manage these server blades and the switch blade. The server blade functions as a server in a network. The switch blade functions as a network signals exchange.

The first management board 106 and the second management board 108 insert into respective management board slots on the connecting base 118 and the required server blade 102 and switch blade 104 insert into blade slots on the connecting base 118 when the user establishes and uses the blade server management system according to the present invention. Therefore, the blade server management system determines the first management board 106 and the second management board 108 to be a master management board and a slave management board according to positions of the management board slot on the connecting base 118 and heart beat signals from the management board. For example, if the first management board 106 inserts into the first management board slot and the second management board 108 inserts into the second management board slot, the first management board 106 waits for a first predetermined period to detect the heart beat signals from another management board, such as the second management board 108. Until the first predetermined period passed, there is no heart beat signals from other management board and the first management board 106 is automatically the master management board of the blade server management system according to the present invention. The master management board then sends out heart beat signals to the other management board. Within the first predetermined period, if the first management board 106 receives heart beat signals from another management board, the first management board 106 automatically becomes the slave management board of the blade server management system and the slave management board then enters a monitor mode to monitor the blade server management system with a hardware isolation design.

Furthermore, the second management board 108 inserted in the second management board slot on the connecting base 118 waits for a second predetermined period to catch the heart beat signals from the other management board, such as the first management board 106. Until the second predetermined period passed, there is no heart beat signals from other management board and the second management board 108 is automatically the master management board of the blade server management system according to the present invention. The master management board then sends out heart beat signals to the other management board. Within the second predetermined period, if the second management board 108 receives the heart beat signals from the other management board, the second management board 108 automatically becomes the slave management board of the blade server management system and then the slave management board enters a monitor mode to monitor the blade server management system with a hardware isolation design.

For the preferred embodiment, the second predetermined period is longer than the first predetermined period by a little bit; for example, the first predetermined period is about 3 seconds and the second predetermined period is about 5 seconds. That is to say, in the preferred embodiment, the first management board 106 inserted in the first management board slot waits for 3 seconds to be sure that no existant master management board is sending out heart beat signals. If the result is positive after a 3-second wait, the first management board 106 automatically becomes the master management board. Similarly, the second management board 108 inserted in the second management board slot waits for 5 seconds to be certain that no existant master management board is sending out heart beat signals. If the result is positive after a 5-second wait, the second management board 108 automatically becomes the master management board. Therefore, the blade server management system according to the present invention utilizes a clear time deviation to determine the master management board and the slave management board.

The blade server management system with an auxiliary management structure according to the present invention automatically designates the second management board 108 as the master management board when the first management board slot fails to assert itself as the management board after the second predetermined period of about 5 seconds.

After the management boards recognize the master management board and the slave management board, the master management board is in charge of controlling the whole blade server management system and recording all system statuses to the memory 116, such as the electrically erasable programmable read only memory. In the meantime, the slave management board maintains the monitor mode, in which it stands by to take over the whole blade server management system and be a new master management board if the original master management board should fail. Therefore, the new master management board reads the system statuses from the memory 116 to continue controlling the system. Because the slave management board is promoted to master management board status when the original master management board fails, the blade server management system according to the present invention can be controlled smoothly.

After the slave management board is promoted to master management board status, the failed management board can be replaced directly from the first management board slot of the blade server management system. While the failed management board is repaired, the repaired management board can be inserted into the first management board slot directly. The second management board inserted in the second management board slot, the new master management board, sends out the heart beat signals to others, and the repaired management board, the first management board 106, inserted in the first management board slot therefore becomes a new slave management board of the blade server management system. Accordingly, the blade server management system with an auxiliary management structure according to the present invention can control the whole system at all times without any management dead space.

The master management board and slave management board transfer important data to each other by way of first COM ports 126 and 136 respectively. The slave management board does not control the server blades and the switch blades due to the hardware isolation design. The slave management board only gets information from the master management board by way of COM ports 126 and 136. The information includes media access control (MAC) address and a chassis identification code. In this moment, the master management board also obtains data from the slave management board by way of the COM ports 126 and 136. The data include the field replacement unit (FRU) and the MAC address of the local area network.

Because the slave management board does not control the server blades and the switch blades, the management system is not in conflict and does not reduce the system efficiency. The slave management board gets the information from the master management board by way of the COM ports 126 and 136. Therefore, if the master management board crashes or the server manager requests a change of the master management board via an application software, the slave management board immediately becomes the master management board. Because the slave management board cannot detect the heart beat signals from the master management board, the slave management board becomes a new master management board and sends out new heart beat signals and information to update the relevant information of the management system. Therefore, the new master management board controls the server blades, the switch blade, and the whole management system to avoid a management break and data loss.

Further, the slave and master information and data are guaranteed to be the same at the moment when the slave management board is used instead of the master management board. The blade server management system with an auxiliary management structure according to the present invention not only uses the COM ports 126 and 136 to transfer the data and information but also uses the LAN ports 124 and 134 to form an auxiliary interconnecting line to transfer the data and information if the COM ports fail to connect to each other. The LAN ports 124 and 134 also provide the network connection of the blade server management system to deliver the network packets. The blade server management system according to the present invention utilizes the switch blade 104 to connect with the network for reducing the quantity of network cables, and can also utilize the LAN ports 124 and 134 directly to connect the network with each management board for controlling the blade server management system.

Furthermore, the management boards of the blade server management system with an auxiliary management structure according to the present invention further include second COM ports 122 and 132. The second COM ports 122 and 132 can directly connect with a first local computer 112 and a second local computer 114. Therefore, the server manager can use the local computer to control directly the blade server management system according to the present invention.

The present invention utilizes the hardware isolation design to avoid a conflict between the slave management board and the management system and utilizes the COM port and LAN port to connect the two management boards to maintain important data and information synchronization. Therefore, the slave management board can prepare to take over the management system immediately to control the server blades and the switch blades without any management break. The server manager can replace the damaged management board without influence of the normal operation condition. Moreover, the LAN ports assist the COM ports to maintain data and information synchronization. The management system can work more safely and is more stable. Hence, the server manager can control the computer servers with lower risk. The server manager can change the damaged management boards to keep the system working smoothly. The slave management board and the LAN ports are prepared to take over the master management board and the COM port, at any time, respectively. The management boards can further connect with the network directly and the local computer can access the blade server management system according to the present invention with COM ports. Accordingly, a lower risk control of the computer server is achieved. The present invention is not limited to two management boards, and the user can determine the quantity of the management boards.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A blade server management system with an auxiliary management structure for controlling server blades and switch blades, the blade server management system with an auxiliary management structure comprising:
- a connecting base including a plurality of blade slots, a first management board slot, and a second management board slot, wherein the server blades and the switch blades are inserted in the plurality of blade slots;
- a first management board connecting with the first management board slot, wherein the first management board waits for a first predetermined period to receive first heart beat signals, and the first management board becomes a master management board and controls the server blades and switch blades and then sends out second heart beat signals if the first management board fails to receive the first heart beat signals after the first predetermined period;
- a second management board connecting with the second management board slot, wherein the second management board becomes a slave management board if the second management board receives the second heart beat signals, and the slave management board obtains information from the master management board to stand by to take over the master management board; and
- a memory connecting with the connecting base to record working statuses of the master management board,
- wherein the master management board and the slave management board transfer and maintain information synchronization therebetween by way of communication ports, and the master management board and the slave management board transfer and maintain the information synchronization therebetween by way of local area network ports when the communication ports fail to connect.

2. The blade server management system with an auxiliary management structure of claim 1, wherein the second management board becomes a new master management board to take over an original master management board, obtain the working statuses of the original master management board from the memory, and send out the first heart beat signals if the second management board cannot receive the second heart beat signals after a second predetermined period, and the memory continues to record the working statuses of the new master management board.

3. The blade server management system with an auxiliary management structure of claim 2, wherein the second predetermined period for the second management board is longer than the first predetermined for the first management board.

4. The blade server management system with an auxiliary management structure of claim 3, wherein the second predetermined period for the second management board is about 5 seconds and the first predetermined period for the first management board is about 3 seconds.

5. The blade server management system with an auxiliary management structure of claim 1, wherein the first management board becomes a new slave management board and obtains information regarding a new master management board to stand by controlling the server blades and the switch blades if the first management board obtains the first heart beat signals within the first predetermined period.

6. The blade server management system with an auxiliary management structure of claim 1, wherein the information synchronization includes the master management board transferring a media access control (MAC) address and a chassis identification (chassis ID) to the slave management board.

7. The blade server management system with an auxiliary management structure of claim 6, wherein the information synchronization includes the slave management board further transferring data of a field replacement unit and a media access control address to the master management board.

8. The blade server management system with an auxiliary management structure of claim 1, wherein the master management board and the slave management board change each other according to an application software request, and the master management board becomes the slave management board and the slave management board becomes the master management board.

9. The blade server management system with an auxiliary management structure of claim 1, wherein the master management board and the slave management board are separated by hardware isolations to keep the slave management board from directly controlling the server blades and the switch blades.

10. The blade server management system with an auxiliary management structure of claim 1, wherein the slave management board takes over the master management board to become a new master management board and the new master management board sends out information to update information regarding the management system when an original master management board fails to work, whereby then the management system is immediately controlled by the new master management board.

11. The blade server management system with an auxiliary management structure of claim 1, wherein the master management board and the slave management board each includes a management communication port to connect to a local computer to stand by to control the server blades and the switch blades.

12. A blade server management system with an auxiliary management structure comprising:
- at least one server blade providing computer server functions;
- at least one switch blade providing network signal switch functions;
- two management boards having a capacity to generate heart beat signals and control the server blades and the switch blades, wherein each management board further comprises:
- a first communication port for information synchronization within the two management boards;
- a second communication port connecting with a local computer capable of directly controlling the server blades and the switch blades; and
- a local area network port connecting with the switch blades to deliver network packets and messages;
- a connecting base having a first management board slot and a second management board slot to connect the two management boards and a plurality of blade slots to connect the server blades and the switch blades; and
- a memory connecting with the connecting base to record working statuses of the management boards.

13. The blade server management system with an auxiliary management structure of claim 12, wherein
if a management board inserted in the first management board slot waits for a first predetermined period and fails to obtain heart beat signals from another management board, the management board inserted in the first management board slot becomes a master management board, controls the server blades and the switch blades, and generates heart beat signals to a management board inserted in the second management board slot, whereupon the management board inserted in the second management board slot becomes a slave management board and connects with the master board with the respective first communication port for information synchronization and stands by to take over as the master management board; and if the management board inserted in the second management board slot waits for a second predetermined period and fails to obtain heart beat signals from the management board inserted in the first management board slot, the management board inserted in the second management board slot becomes a new master management board, controls the server blades and the switch blades, and generates heart beat signals to the management board inserted in the first management board slot, whereupon the management board inserted in the first management board slot becomes a new slave management board to connect the new master management board with the respective first communication port for information synchronization and to stand by to take over as a subsequent master management board, wherein the second predetermined period is longer than the first predetermined period.

14. The blade server management system with an auxiliary management structure of claim 13, wherein the new master management board obtains the working statuses of an original master management board from the memory and continues control of server blades and the switch blades when the new master management board takes over from the original master management board, and the memory continues to record the working statuses of the new master management board.

15. The blade server management system with an auxiliary management structure of claim 13, wherein the master management board and the slave management board transfer and maintain the information synchronization therebetween by way of the local area network ports when the first communication ports fails to connect.

16. The blade server management system with an auxiliary management structure of claim 15, wherein the information synchronization includes the master management board transferring a media access control (MAC) address and a chassis identification (chassis ID) to the slave management board.

17. The blade server management system with an auxiliary management structure of claim 16, wherein the information synchronization includes the slave management board further transferring data of a field replacement unit and a media access control address to the master management board.

18. The blade server management system with an auxiliary management structure of claim 13, wherein the master management board and the slave management board are separated by hardware isolations to keep the slave management board from directly controlling the server blades and the switch blades.

19. A blade server management system with an auxiliary management structure for controlling server blades and switch blades, the blade server management system with an auxiliary management structure comprising:
- a connecting base including a plurality of blade slots, a first management board slot, and a second management board slot, wherein the server blades and the switch blades are inserted in the plurality of blade slots;
- a first management board connecting with the first management board slot, wherein the first management board waits for a first predetermined period to receive first heart beat signals, and the first management board becomes a master management board and controls the server blades and switch blades and then sends out second heart beat signals if the first management board fails to receive the first heart beat signals after the first predetermined period;
- a second management board connecting with the second management board slot, wherein the second management board becomes a slave management board if the second management board receives the second heart beat signals, and the slave management board obtains information from the master management board to stand by to take over the master management board; and
- a memory connecting with the connecting base to record working statuses of the master management board, wherein the master management board and the slave management board change each other according to an application software request, and the master management board becomes the slave management board and the slave management board becomes the master management board.

* * * * *